US008844002B2

(12) United States Patent
Monahan et al.

(10) Patent No.: US 8,844,002 B2
(45) Date of Patent: Sep. 23, 2014

(54) METHOD AND SYSTEM FOR NOTIFICATION AND REQUEST PROCESSING

(75) Inventors: Jay Monahan, Los Gatos, CA (US); Abhilash P. Puthenveetil, Santa Clara, CA (US)

(73) Assignee: eBay Inc., San Jose, CA (US)

(*) Notice: Subject to any disclaimer, the term of this patent is extended or adjusted under 35 U.S.C. 154(b) by 1296 days.

(21) Appl. No.: 11/771,180

(22) Filed: Jun. 29, 2007

(65) Prior Publication Data

US 2009/0007244 A1 Jan. 1, 2009

(51) Int. Cl.
*H04L 29/00* (2006.01)
*H04L 29/06* (2006.01)
*H04L 9/32* (2006.01)

(52) U.S. Cl.
CPC ............... *H04L 9/32* (2013.01); *H04L 2209/56* (2013.01); *H04L 63/105* (2013.01); *H04L 2209/80* (2013.01)
USPC .................................. 726/5; 726/6; 370/331

(58) Field of Classification Search
USPC .............................................. 726/6; 370/331
See application file for complete search history.

(56) References Cited

U.S. PATENT DOCUMENTS

| 5,790,800 | A | * | 8/1998 | Gauvin et al. ................ 709/227 |
| 5,845,265 | A | | 12/1998 | Woolston |
| 6,085,176 | A | | 7/2000 | Woolston |
| 6,202,051 | B1 | | 3/2001 | Woolston |
| 6,266,651 | B1 | | 7/2001 | Woolston |
| 7,194,761 | B1 | * | 3/2007 | Champagne ..................... 726/6 |
| 2005/0033655 | A1 | | 2/2005 | Woolston |
| 2005/0273596 | A1 | * | 12/2005 | Benantar et al. ............. 713/156 |
| 2006/0067274 | A1 | * | 3/2006 | Gillespie et al. ............. 370/331 |

FOREIGN PATENT DOCUMENTS

WO WO-9634356 A1 10/1996

* cited by examiner

*Primary Examiner* — Jeffrey Pwu
*Assistant Examiner* — Michael D Anderson
(74) *Attorney, Agent, or Firm* — Schwegman Lundberg & Woessner, P.A.

(57) ABSTRACT

Embodiments of a method and system for notification and request processing are disclosed. A service request for a second application may be received from a first application. Authorization of the first application to send the service request to the second application through a user communication client may be verified. A provider communication identifier of the second application may be identified. The service request may be provided from the user communication client to a provider communication client associated with the provider communication identifier.

47 Claims, 16 Drawing Sheets

METHOD AND SYSTEM FOR NOTIFICATION AND REQUEST PROCESSING

TECHNICAL FIELD

Example embodiments relate generally to the field of data processing and, in some embodiments, to a method and system for notification and request processing.

BACKGROUND

A user that communicates directly with an application on a third party server typically provides a user name and password through a user interface to gain access. When seeking communication with the application through a client running on a client machine, the user may not want to save a user name and/or password within the client to access the provider because of security concerns with the client, limitations on the functionality of the client, and the like.

The provider typically provides notifications to the user regarding potential problems, special offers, and the like. However, users that receive the notifications may have difficulty in determining whether the notification was actually provided by the provider or by an unauthorized third party that was pretending to be the provider. Users that respond to the unauthorized third party notification may mistakenly provide the unauthorized third party with a user name and password that may allow the unauthorized third party to access the user account, account information, payment information, and the like.

BRIEF DESCRIPTION OF THE DRAWINGS

Some embodiments are illustrated by way of example and not limitation in the figures of the accompanying drawings in which.

DETAILED DESCRIPTION

Example methods and systems for messaging notifications are described. In the following description, for purposes of explanation, numerous specific details are set forth in order to provide a thorough understanding of example embodiments. It will be evident, however, to one skilled in the art that the present invention may be practiced without these specific detail In an example embodiment, a service request for a second application may be received from a first application. Authorization of the first application to send the service request to the second application through a user communication client may be verified. A provider communication identifier of the second application may be identified. The service request may be provided from the user communication client to a provider communication client associated with the provider communication identifier.

In an example embodiment, a service request and a user communication identifier may be received from a provider communication client. A user associated with the user communication identifier may be identified. Verification that the user has authorized service request processing through a user communication client has been made. The service request responsive to the authorized service request processing being verified may be processed.

In an example embodiment, a notification for a user of a provider application may be generated. A user communication identifier associated with the user may be determined. The notification may be provided to a provider communication client associated with the user communication identifier. The provider communication client may be capable of providing the notification to a user communication client associated with the user.

In an example embodiment, a notification and a selection of a user communication identifier may be received from a provider application. The user communication identifier may be included in a provider contacts list. Verification that the provider application has been authorized by a communication provider server to communicate through a provider communication client may be made. The notification may be provided to a user communication client associated with the user communication identifier through the provider communication client.

In an example embodiment, a notification for a user associated with a user communication identifier may be received from a provider communication client. A first determination may be made as to whether the provider communication client is associated with an authorized provider. The notification may be selectively presented to the user in a designated area of a user communication client based on the determination of whether the provider communication client is associated with the authorized provider.

Figure 1:
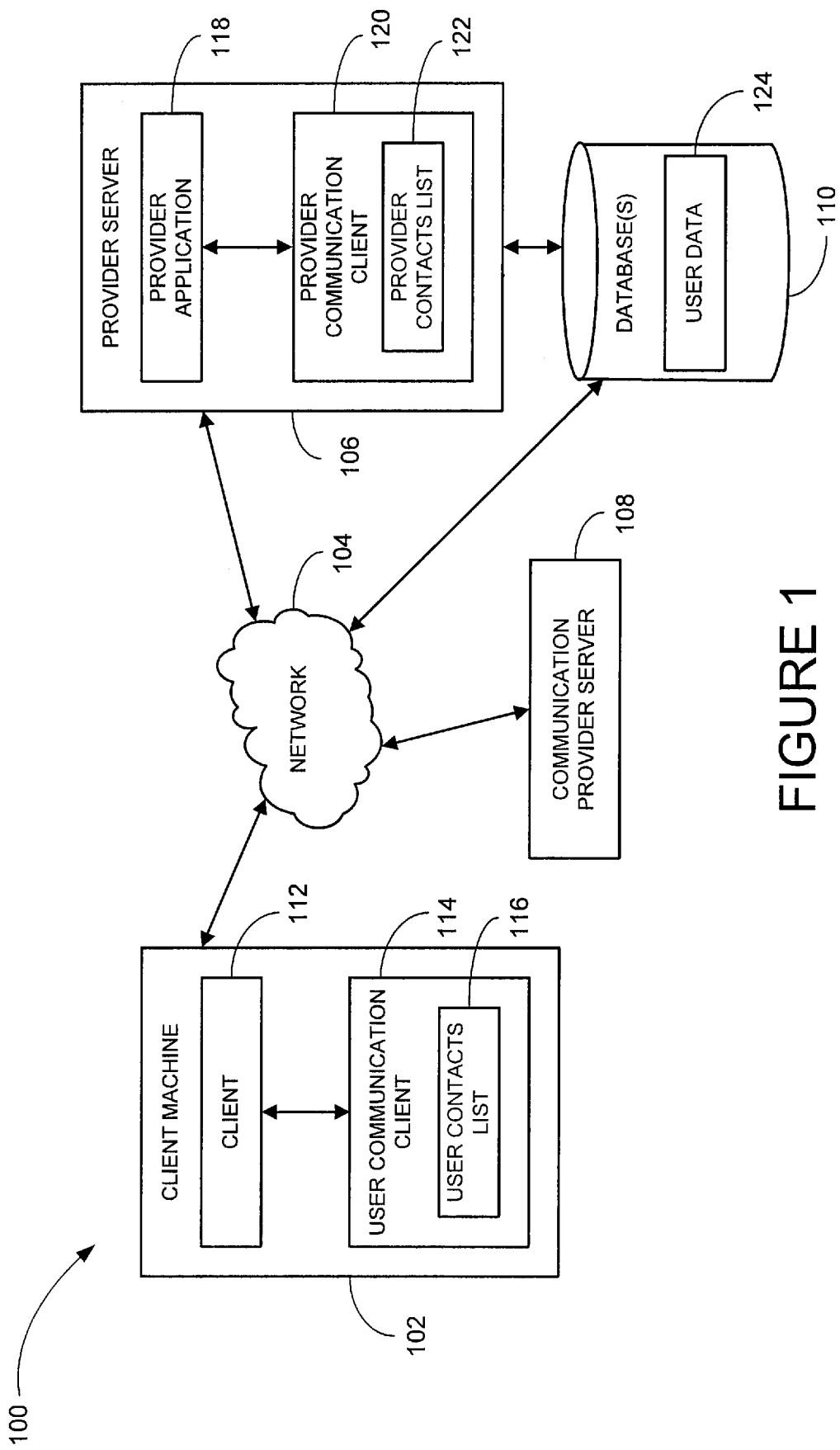
FIG. 1 is a block diagram of a system, according to an example embodiment.

FIG. 1 illustrates an example system 100 in which an application, in the example form of a client 112 of a client machine 102, may communicate with a provider application 118 of a provider server 106 over a network 104. Examples of the client machine 102 include a set-top box, a receiver card, a mobile phone, and a computing system; however other devices may also be used.

The network 104 may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The client 112 may communicate with the provider server 106 over the network 104 through an unsecured channel via a protocol. The protocol may be HTTP, HTTPS, or another type of network protocol.

The client 112 may, for example, enable a user to list items at a fixed and/or variable price with the provider application 118, manage an online financial account (e.g., to make and receive payments and/or manage finances) with the provider application 118, or to otherwise request processing by the provider application 118 for other purposes. The client 112 may, for example, be the TurboLister™ application developed by eBay Inc., of San Jose, Calif., TURBOTAX by Intuit Inc., of Mountain View, Calif., or another client. The client 112 may provide some server-side functionality to be implemented client-side including, by way of an example, listing items for sale.

The client 112 may receive a user name and a password from a user to participate in a communication session (e.g., a single session, multiple sessions, or every session) with the provider application 118. As an alternative to the use of the user name and password, the client 112 may use a user communication client 114 to communicate with the provider application 118 to enable the user to participate in the communication session.

The receipt of a communication sent from the user communication client 114 may enable the provider application to verify that the client 112 is authorized for access and use of a service provided by the provider application 118. The client 112 may use the user communication client 114 to leverage the security provided by the system of communication clients as opposed to direct connect via a protocol. For example, the communication clients may utilize secured measures used by the communication clients to communicate.

A user may selectively log in (e.g., by use of a user name and password) or automatically log in to the user communication client 114. Once the user has logged in, the user communication client 114 may communicate over the network 104 with the provider communication client 120 over a secure channel. The provider communication client 120 and the user communication client 114 may be capable of communicating using a protocol in a peer-to-peer system, a client-server based system, or in another type of system. For example, the communication clients 114, 120 may be SKYPE clients, AOL Instant Messenger clients, MICROSOFT communication clients, YAHOO! communication clients, and the like. The communication clients 114, 120 may be offered by the same organization or different organizations.

The user communication client 114 may communicate with the client 112 and the provider communication client 120 may communicate with the provider application 118 through application programmer interface (API) calls or otherwise. In an example embodiment, the client 112 may attempt to communicate with the provider application 118 when a user attempts to list an item through the client 112. The client 112 sends the provider application 118 API-calls as data through the user communication client 114. The provider communication client 120 may receive and forward the API calls and a user communication identifier of the user communication client 114 to the provider application 118. The provider application may determine the user name associated with the user communication identifier and process the API calls.

The user communication client 114 may notify a user of an attempt by an application or client (e.g., the client 112) to communicate through the user communication client 114. A user may respond to the notification by authorizing the communication through the user communication client 114. The user may already be logged into the user communication client 114 before the client 112 may be permitted to communicate through the user communication client 114.

The communication clients 114 and 120 may each be provided with a communication identifier by a communication provider server 108 to identify the communication clients 114 and 120 among the plurality of communication clients 114 associated with the communication provider server 108. The communication identifier provided to a user of the user communication client 114 may be the same or different than the user name used by the user of the client 112. The communication clients 114 and 120 may be downloaded from the communication provider server 108 or from a third-party site.

The provider application 118 may be associated with a service provider and capable of storing an association of the user name of a user of the provider application 118 with the communication identifier in user data 124 in a database 110. The provider application 118 may be capable of providing functionality such as, by way of an example, terminating or approving of a pending transaction. A communication preference profile of the user may also be stored in the user data 124 of the database 110. In an example embodiment, the database 110 may be available to the provider application 118 directly or over the network 104.

The provider server 106 may be authorized as an authorized provider for communicating with a plurality of user communication clients 114. For example, an operator of the provider server 106 may pay a fee to the communication provider operating the communication provider server 108, may be affiliated with the communication provider, or be otherwise authorized.

The provider application 118 may provide a notification to a user of the client machine 102 on a designated area of the user interface of the user communication client 114. The notification may optionally, in addition or in the alternative, be sent to a different client machine 102 that does not include the user communication client 114 through, by way of example, short message service (SMS), e-mail, text messaging, and the like. The notifications may include an optional link for a user to click to take the user to a web site. A user may optionally specify to the provider application 118 of a user preference to receive notifications on the designated area as opposed to receiving the notification through e-mail or otherwise.

Figure 2:
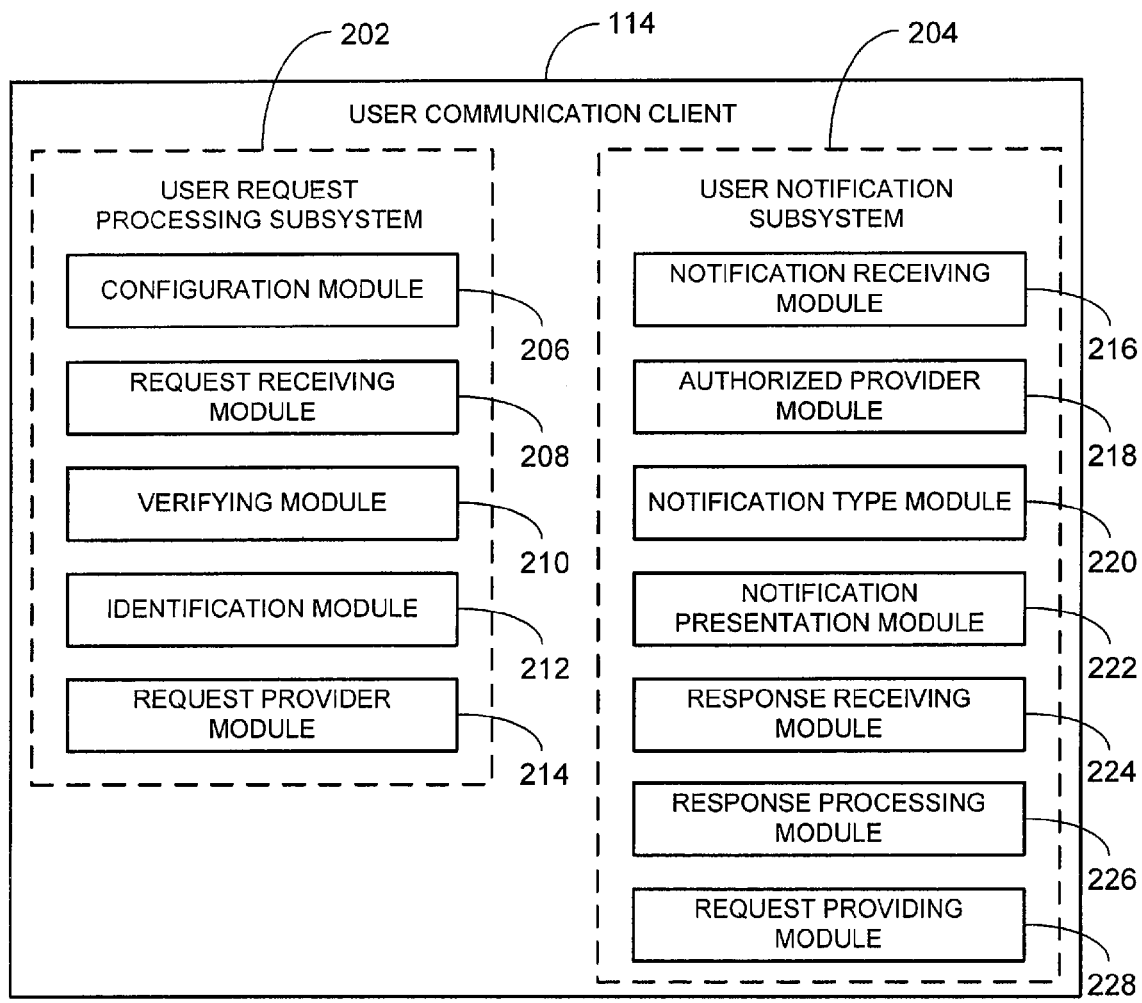
FIG. 2 is a block diagram of an example programmable application that may be deployed within the system of FIG. 1 according to an example embodiment.

FIG. 2 is an example of the user communication client 114 that may be deployed in the system 100 (see FIG. 1) or another system according to an example embodiment. The user communication client 114 may include a user request processing subsystem 202 and/or a user notification subsystem 204. Other subsystems may also be used.

The user request processing subsystem 202 may include a configuration module 206, a request receiving module 208, a verifying module 210, an identification module 212, and a request provider module 214. Other modules may also be used.

The configuration module 206 configures the user communication client 114 to communicate with the provider communication client 120 for the client 112. The request receiving module 208 receives a service request for the provider application 118 from the client 112.

The verifying module 210 verifies authorization of the client 112 to send the service request to the provider application 118 through the user communication client 114. The identification module 212 identifies a provider communication identifier of the provider application 118 from the user contacts list 116. The request provider module 214 provides the service request from the user communication client 114 to the provider communication client 120 associated with the provider communication identifier.

The user notification subsystem 204 may include a notification receiving module 216, an authorized provider module 218, a notification type module 220, a notification presentation module 222, a response receiving module 224, a response processing module 226, and/or a request providing module 228. Other modules may also be used.

The notification receiving module 216 receives a notification for a user associated with a user communication identifier from the provider communication client 120. The authorized provider module 218 determines whether the provider communication client 120 is associated with an authorized provider.

The notification type module 220 determines a notification type of the notification from the notification message. The notification presentation module 222 presents the notification to the user in a designated area of the user communication client 114 when the provider communication client 120 is associated with the authorized provider and optionally when the notification type has been authorized for presentation. In an example embodiment, the designated area may be a region of a graphical user interface (GUI).

In an example embodiment, the designated area may include an exclusive area of the user communication client 114 for presenting the notification to the user. For example, other communications received by the user communication client 114 may not be presented in the exclusive area. The use of an exclusive area may reduce the likelihood of a user responding to a notification not received from the provider.

In an example embodiment, the designated area may include an area in which other communications are received by the notifications received are designated with an icon or other indicia to reflect that the communications were received from a provider. Other configurations of the designated area may also be used.

The response receiving module 224 receives a response from the user to the notification. The response processing module 226 processes the response. The request providing module 228 provides an authorization request or a termination request to the provider application 118.

Figure 3:
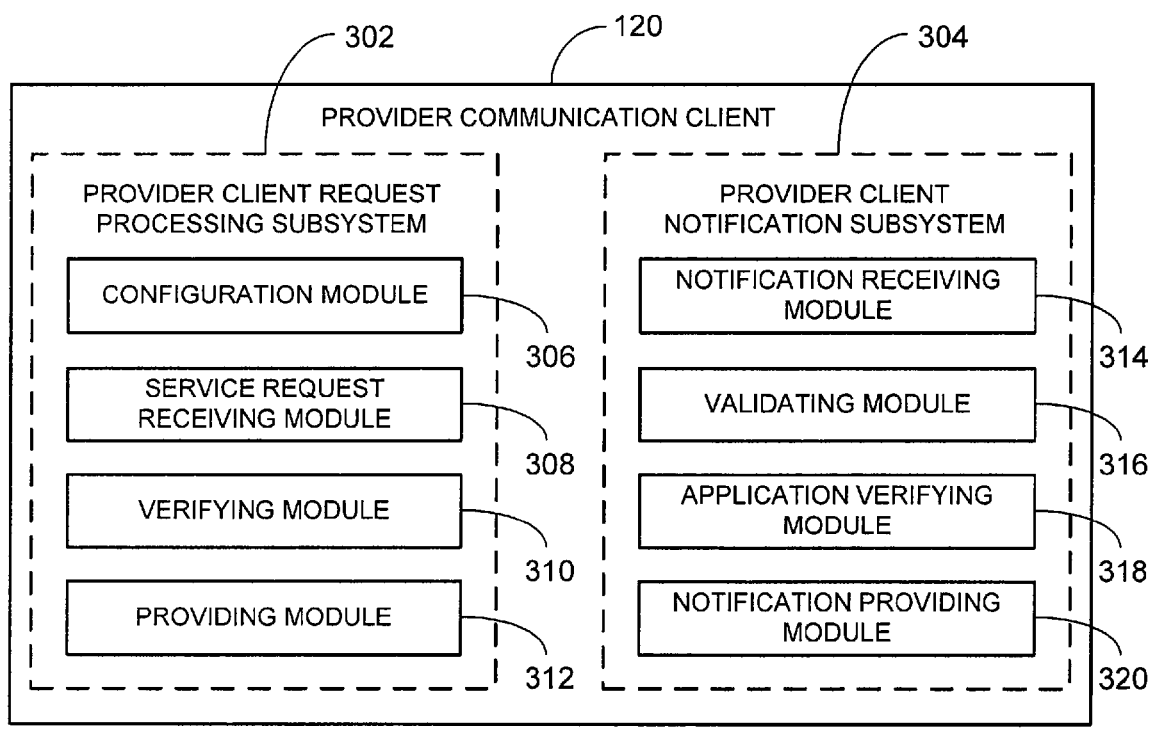
FIG. 3 is a block diagram of an example provider communication client that may be deployed within the system of FIG. 1 according to an example embodiment.

FIG. 3 is an example of the provider communication client 120 that may be deployed in the system 100 (see FIG. 1) or another system according to an example embodiment. The provider communication client 120 may include a provider client request processing subsystem 302 and/or a provider client notification subsystem 304. Other subsystems may also be used.

The provider client request processing subsystem 302 may include a configuration module 306, a service request receiving module 308, a verifying module 310, and/or a providing module 312. Other modules may also be used.

The configuration module 306 configures the provider communication client 120, by way of an example, to enable communication of the provider application 112 through the provider communication client 120. The service request receiving module 308 receives a service request and a user communication identifier from the user communication client 114.

The verifying module 310 verifies that the user communication identifier is on the provider contacts list 122 of the provider communication client 120. The providing module 312 provides a service request to the provider application 118.

The provider client notification subsystem 304 may include a notification receiving module 314, a validating module 316, an application verifying module 318, and/or a notification providing module 320. Other modules may also be used.

The notification receiving module 314 receives a notification and a selection of a user communication identifier on the provider contacts list 122 from the provider application 118. The validating module 316 validates the provider application 118 by a verification criterion (e.g., an IP address).

The application verifying module 318 verifies that the provider application 118 has been authorized by the communication provider server 108 for communicating through the provider communication client 120. The notification providing module 320 provides the notification through the provider communication client 120 to the user communication client 114 associated with the user communication identifier.

Figure 4:
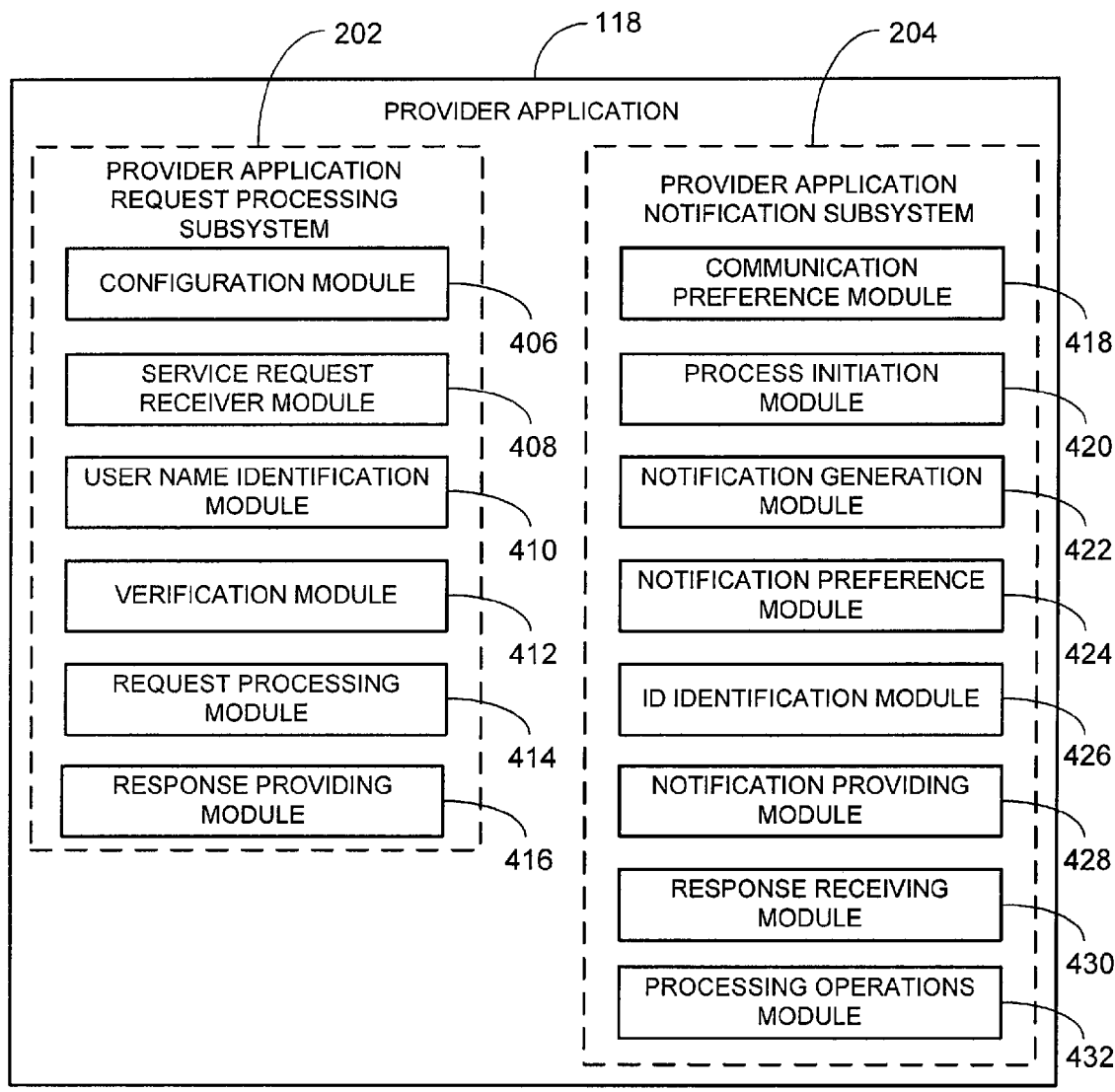
FIG. 4 is a block diagram of an example provider application that may be deployed within the system of FIG. 1 according to an example embodiment.

FIG. 4 is an example of the provider application 118 that may be deployed in the system 100 (see FIG. 1) or another system. The provider application 118 may include a provider application request processing subsystem 402 and a provider application notification subsystem 404. Other subsystems may also be used.

The provider application request processing subsystem 402 may include a configuration module 406, a service request receiver module 408, a user name identification module 410, a verification module 412, a request processing module 414, and/or a response providing module 416. Other modules may also be used.

The configuration module 406 configures the provider application 118, by way of an example, to enable communication through the provider communication client 120. The service request receiver module 408 receives a service request and a user communication identifier from the provider communication client 120.

The user name identification module 410 identifies a user name of the provider application 118 associated with the user communication identifier. The verification module 412 verifies that a user associated with the user name of the provider application 118 and the user communication identifier has authorized processing of the service request through the user communication client 114.

The request processing module 414 processes the service request when the authorized service request processing is verified. The response providing module 416 provides a response to the service request through the provider communication client 120 or directly to the client 112.

The provider application notification subsystem 404 may include a communication preference module 418, process initiation module 420, a notification generation module 422, a notification preference module 424, an identifier identification module 426, a notification providing module 428, a response receiving module 430, and/or a processing operations module 432. Other modules may also be used.

The communication preference module 418 receives a communication preference modification request and modifies a communication preference of the user based on the communication preference modification request.

The process initiation module 420 initiates processing of a transaction. The notification generation module 422 generates a notification regarding the transaction for a user of the provider application 118. The notification preference module 424 determines a notification preference of the user.

The identifier identification module 426 identifies a user communication identifier associated with the user. For example, a user may be identified when the notification preference of the user is to provide the notification through the provider communication client 120. The notification providing module 428 provides the notification to the provider communication client 120 for the user communication identifier.

The response receiving module 430 receives a response to the notification from the user. The processing operations module 432 is able to halt processing or complete processing of the transaction based on the received response from the user.

Figure 5:
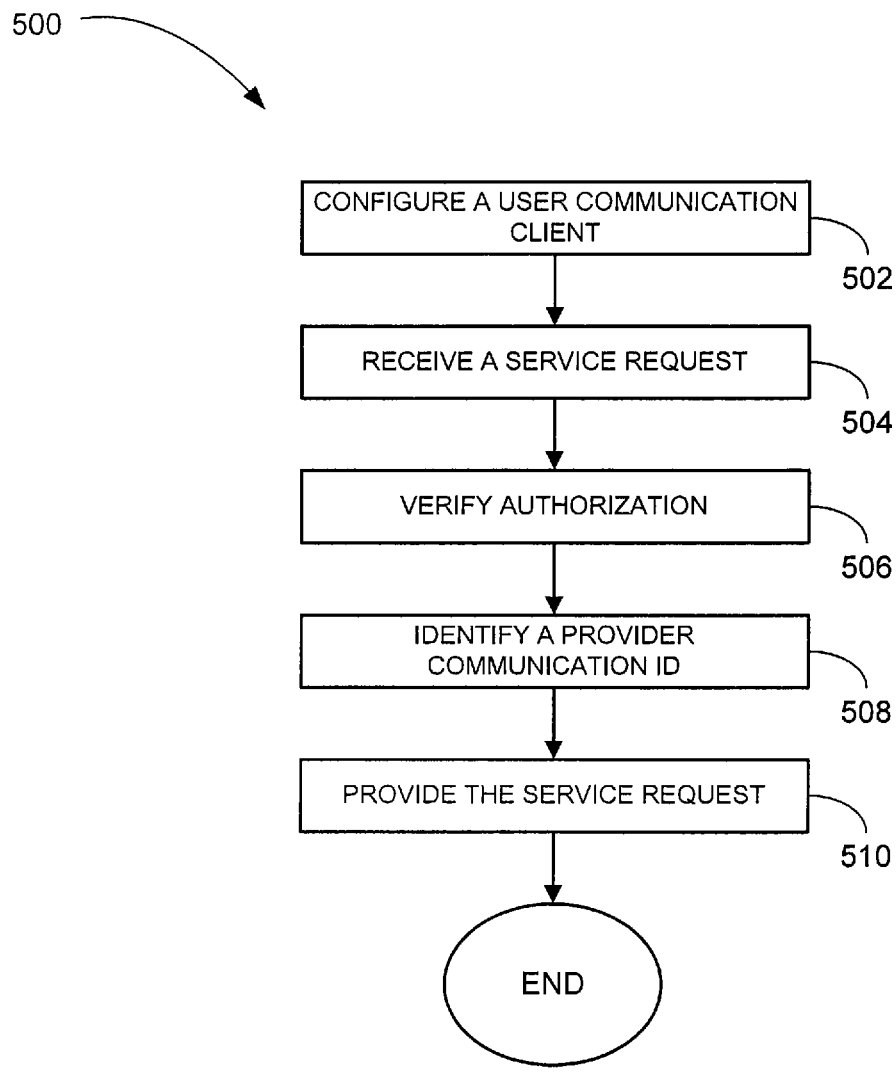
FIG. 5 is a flowchart illustrating a method for providing a service request according to an example embodiment.

FIG. 5 illustrates a method 500 for providing a service request according to an example embodiment. The method 500 may be performed by the user communication client 114 (see FIG. 1) as deployed in the system 100 or in a different system.

The method 500 may enable a user, through use of the client 112 and the user communication client 114, to provide a service request to the provider application 118 through the provider communication client 120 instead of directly with the provider application 118. Providing the service request from the user communication client 114 to the provider communication client 120 may enable a user to avoid providing a user name and/or password of the provider application 118 for access to login and/or other functionality (e.g., listing of items) provided by the provider application 118. The user may, for example, rely on authenticating without potential compromising the user name and password (e.g., for an employee's use of an organizational password).

The user communication client 114 may optionally be configured to communicate with the provider communication client 120 on behalf of the client 112. The provider communication client 120 may be associated with a particular provider application 118 to enable communication from the client 112 through the user communication client 114 to the particular provider application 118.

In an example embodiment, the configuration of the user communication client 114 may include authorizing the user communication client 114 to communicate with the provider communication client 120 for the client 112 and/or adding a provider communication identifier associated with the provider communication client 120 to the user contacts list 116.

A service request for the provider application 118 may be received from the client 112 at block 504. The service request may be a login request, a transaction request, or a different type of request. For example, a user may seek to log in to the provider application 118 by providing a login request through the client 112 that is received by the user communication client 114.

Authorization of the client 112 to send the service request to the provider application 118 through the user communication client 114 may be verified at block 506. For example, the user may preauthorize use of the user communication client 114 to provide the service request to the provider application 118 or may prompt the user in a designated area of a user interface to the user communication client 114 for authorization. The preauthorization or the authorization received from the user in response to the prompt may then be verified at block 506.

A provider communication identifier of the provider application 118 may be identified from the user contacts list 116 at block 508. The provider communication identifier may enable communication with a particular provider communication client 120 among a plurality of communication clients.

The service request may be provided from the user communication client 114 to the provider communication client 120 associated with the provider communication identifier at block 510. The service request may, in an example embodiment, be transmitted via the network 104 from the user communication client 114 to the provider communication client 120 via various communication protocols and techniques.

Figure 6:
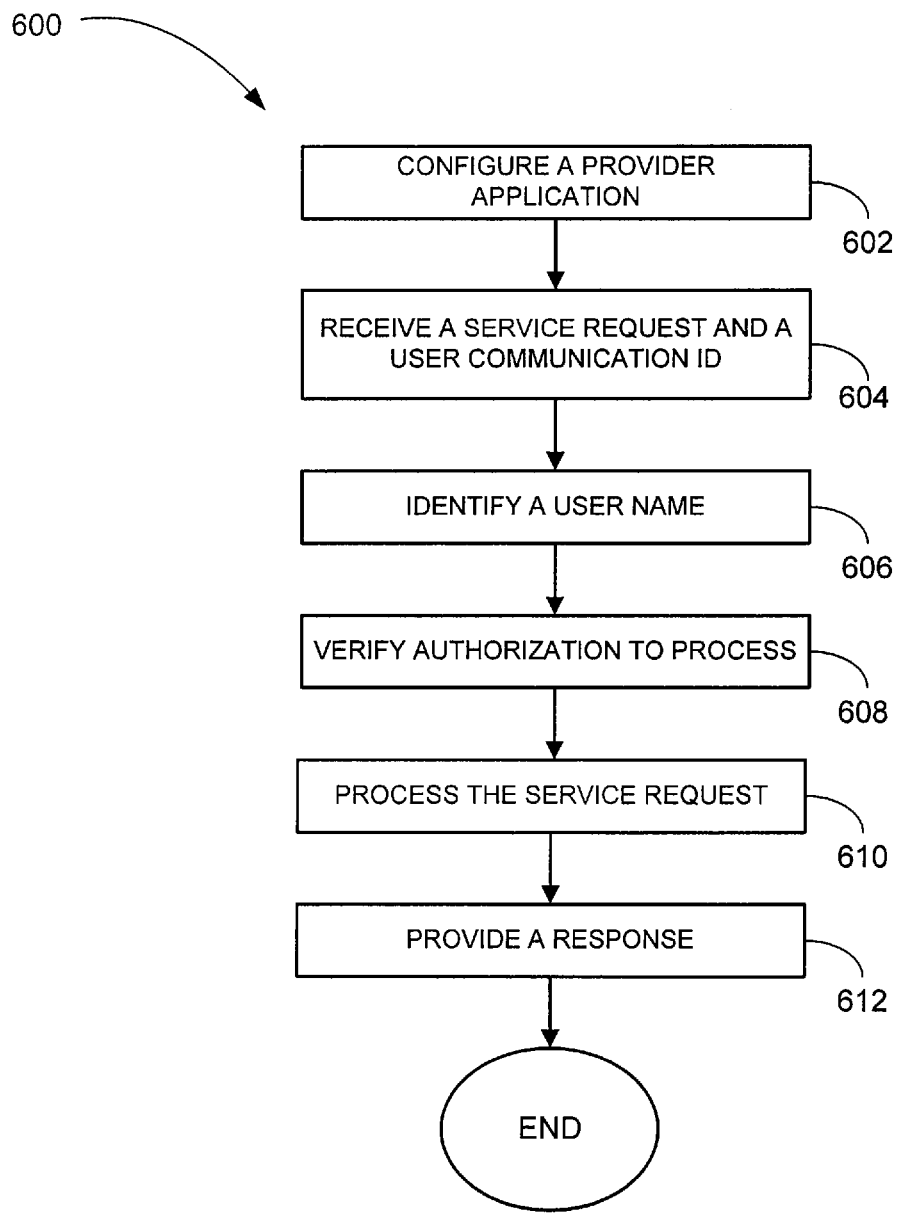
FIG. 6 is a flowchart illustrating a method for processing a service request according to an example embodiment.

FIG. 6 illustrates a method 600 for processing a service request according to an example embodiment. The method 600 may be performed by the provider application 118 (see FIG. 1) as deployed in the system 100 or in a different system.

A provider application 118 may be configured at block 602. The configuration may enable a user to communicate with the provider application 118 through the provider communication client 120. An example embodiment of the configuration of the provider application 118 is described in greater detail below.

A service request and a user communication identifier may be received from the provider communication client 120 at block 604. A user name associated with the user communication identifier may be identified at block 606.

Authorization to process the service request through the user communication client 114 by a user associated with the user name and the user communication identifier may be verified at block 608.

The service request may be processed at block 610 when the authorized service request is verified, and a response to the service request may then be provided at block 612. The response may be provided through the provider communication client 120, the client 112, or otherwise provided.

Figure 7:
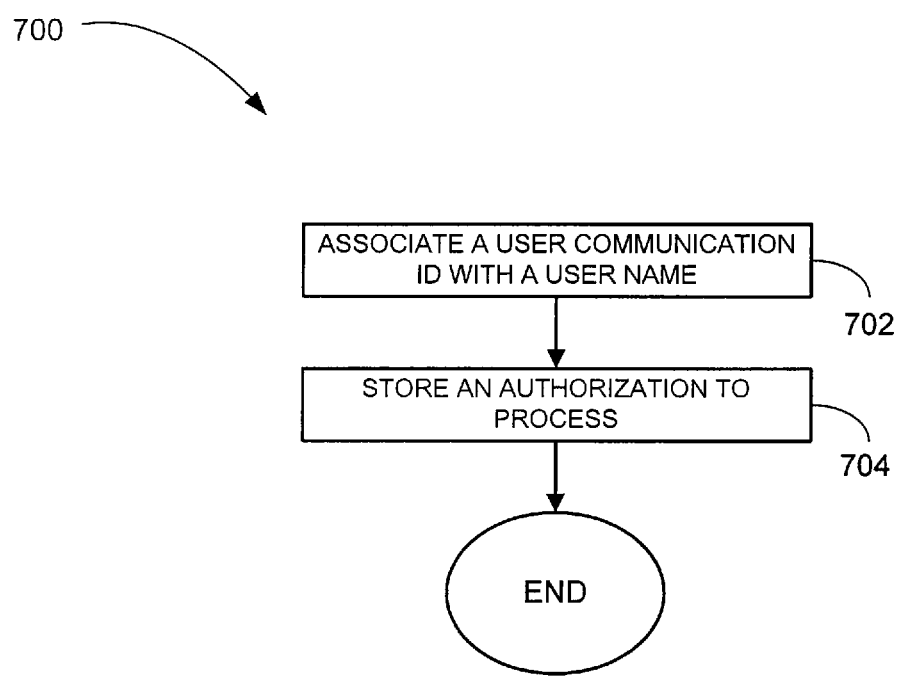
FIG. 7 is a flowchart illustrating a method for configuring the provider application according to an example embodiment.

FIG. 7 illustrates a method 700 for configuring the provider application 118 (see FIG. 1). The method 700 may be performed at block 602 (see FIG. 6) or otherwise performed.

A user communication identifier may be associated with a user name of the provider application 118 at block 702. An authorization may be stored in the user data 124 (see FIG. 1) of the database 110 for a service request of a user associated with the user name and the user communication identifier. The authorization may indicate that the user is to receive a service request through the provider communication client 120 at block 704.

Figure 8:
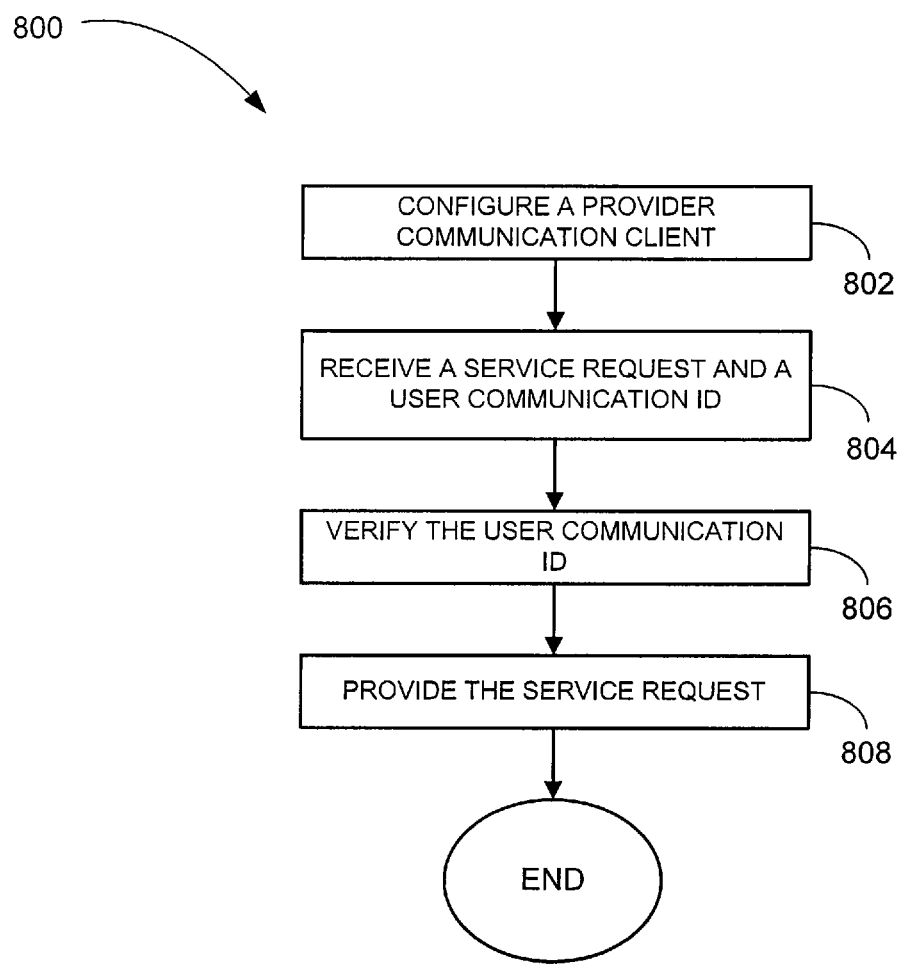
FIG. 8 is a flowchart illustrating a method for processing a service request according to an example embodiment.

FIG. 8 illustrates a method 800 for processing a service request according to an example embodiment. The method 800 may be performed by the provider application 118 (see FIG. 1) as deployed in the system 100 or in a different system.

The provider communication client 120 may be configured at block 802. In an example embodiment, the configuration may include receiving an "add user" request and a user communication identifier and adding the user communication identifier to the provider contacts list 122.

A service request and a user communication identifier may be received from the user communication client 114 at block 804. At block 806, the provider application 118 may verify that the user communication identifier is on the provider contacts list 122. The service request may then be provided to the provider application 118 at block 808.

Figure 9:
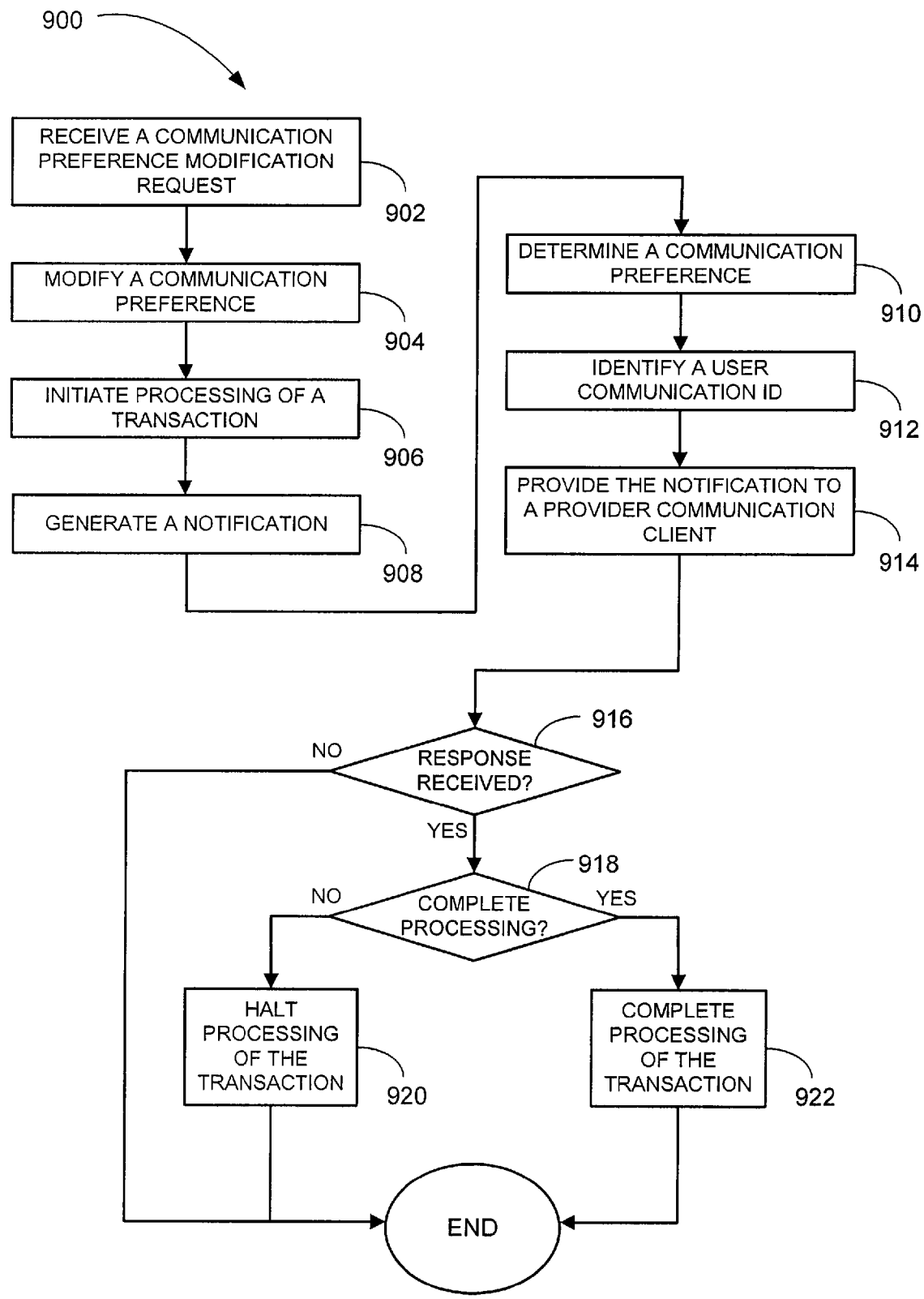
FIG. 9 is a flowchart illustrating a method for providing a notification according to an example embodiment.

FIG. 9 illustrates a method 900 for providing a notification according to an example embodiment. The method 900 may be performed by the provider application 118 (see FIG. 1) as deployed in the system 100 or in another system.

A communication preference modification request may be received at block 902. The communication preference modification request may be a request by a user to modify whether notifications are to be received on a designated area of a user interface of the user communication client or by some other mechanism (e.g., via e-mail, instant message, etc.). A communication preference of the user (e.g., as may be stored among user data 124) may be modified based on the communication preference modification request at block 904.

Processing of a transaction may optionally be initiated at block 906. The transaction may include an item listing, an item sale, an item bid, receipt of a payment, and the like. Other transactions may also be processed.

A notification may be generated for a user of the provider application 118 at block 908. The user may optionally be a party in the transaction. A communication preference of the user may be determined (e.g., from the user data 124) at block 910.

A user communication identifier associated with the user (e.g., to whom the notification is to be transmitted) may be identified (e.g., from the user data 124) at block 912. For example, the user communication identifier may be identified when the communication preference of the user is to provide the notification through the provider communication client 120.

At block 914, the notification may be provided to the provider communication client 120 corresponding to the user communication identifier. The notification may relate to the transaction or may be a notification as selected by an authorized provider. Other types of notifications may also be provided.

A determination may be made at decision block 916 as to whether a response to the notification has been received from the user. If a determination is made that a response has not been received, the method 900 may terminate. If a determination is made at decision block 916 that a response has been received, the method 900 may proceed to decision block 918.

At decision block 918, a determination may be made as to whether processing should be completed. If a determination is made that processing should not been completed, processing of the transaction may be halted at block 920 based on the received response. In an example embodiment, the transaction may be halted automatically until a response is received from the user. If a determination is made at decision block 918 that processing should be completed, processing of the transaction may be completed at block 922 based on the received response.

In an example embodiment, a password and a response may be received from the user, a password of the user may be verified, and a transaction may be processed in accordance with the response.

By way of an example, the method 900 may be used by a credit card provider to provide a notification to a user when a charge to a credit card is made. The charge may be automatically halted, or may be halted based on a response received from the user. The user may be able to selectively process the charge to ensure that the charge is authorized. Other types of providers may use the method 900 in a similar or different manner for other types of transactions and activities.

Figure 10:
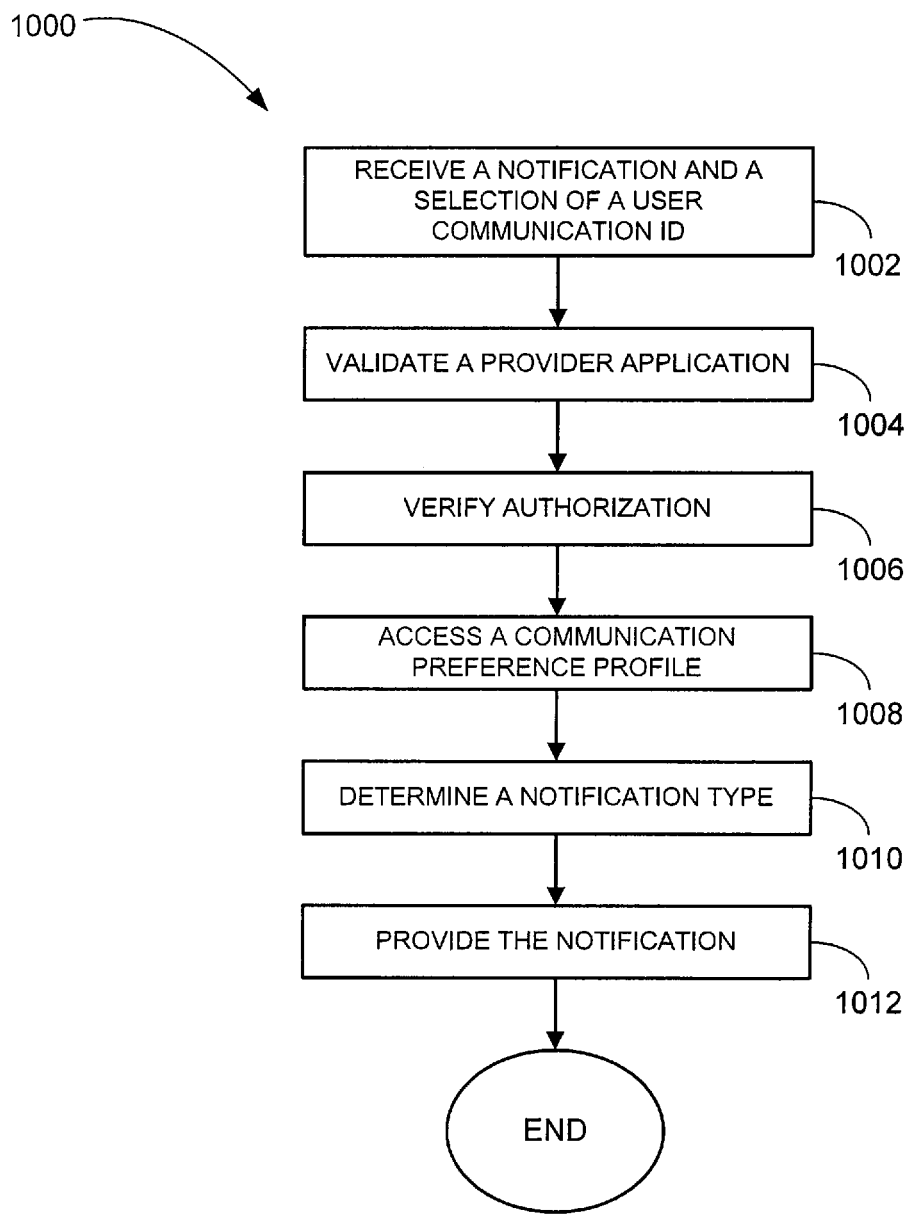
FIG. 10 is a flowchart illustrating a method for providing a notification according to an example embodiment.

FIG. 10 illustrates a method 1000 for providing a notification according to an example embodiment. The method 1000 may be performed by the provider communication client 120 (see FIG. 1) as deployed in the system 100 or in a different system.

A communication and an indication of a user communication identifier on the provider contacts list 122 may be received from the provider application 118 at block 1002.

At block 1004, the provider application 118 may optionally be validated using a verification criterion at block 1004. The verification criterion may include, by way of an example, an IP address or a secret code. Other types of verification criteria may also be used.

Authorization of the provider application 118 to communicate through the provider communication client 120 by the communication provider server 108 may be verified at block 1006.

In an example embodiment, verification may include sending a verification request regarding the provider communication client 120 to the communication provider server 108 and receiving a verification response from the communication provider server 108. The verification response may indicate that the provider application 118 has been authorized by the communication provider server 108 to communicate through the provider communication client 120.

In an example embodiment, verification may include accessing a stored verification of the provider application 118. The stored verification may indicate that the provider application 118 has been authorized by the communication provider server 108 to communicate through the provider communication client 120.

A communication preference profile of the user may be accessed at block 1008. For example, a communication preference profile of the user may be stored in the user data 124 of the database 110 (see FIG. 1). A communication type of the communication may be determined at block 1010. For example, the communication type may include a warning message or an advertisement. Other communication types may also be used.

At block 1012, the communication may be provided to the user communication client 114 associated with the user communication identifier through the provider communication client 120 (e.g., when the communication type is in the communication preference profile of the user).

Figure 11:
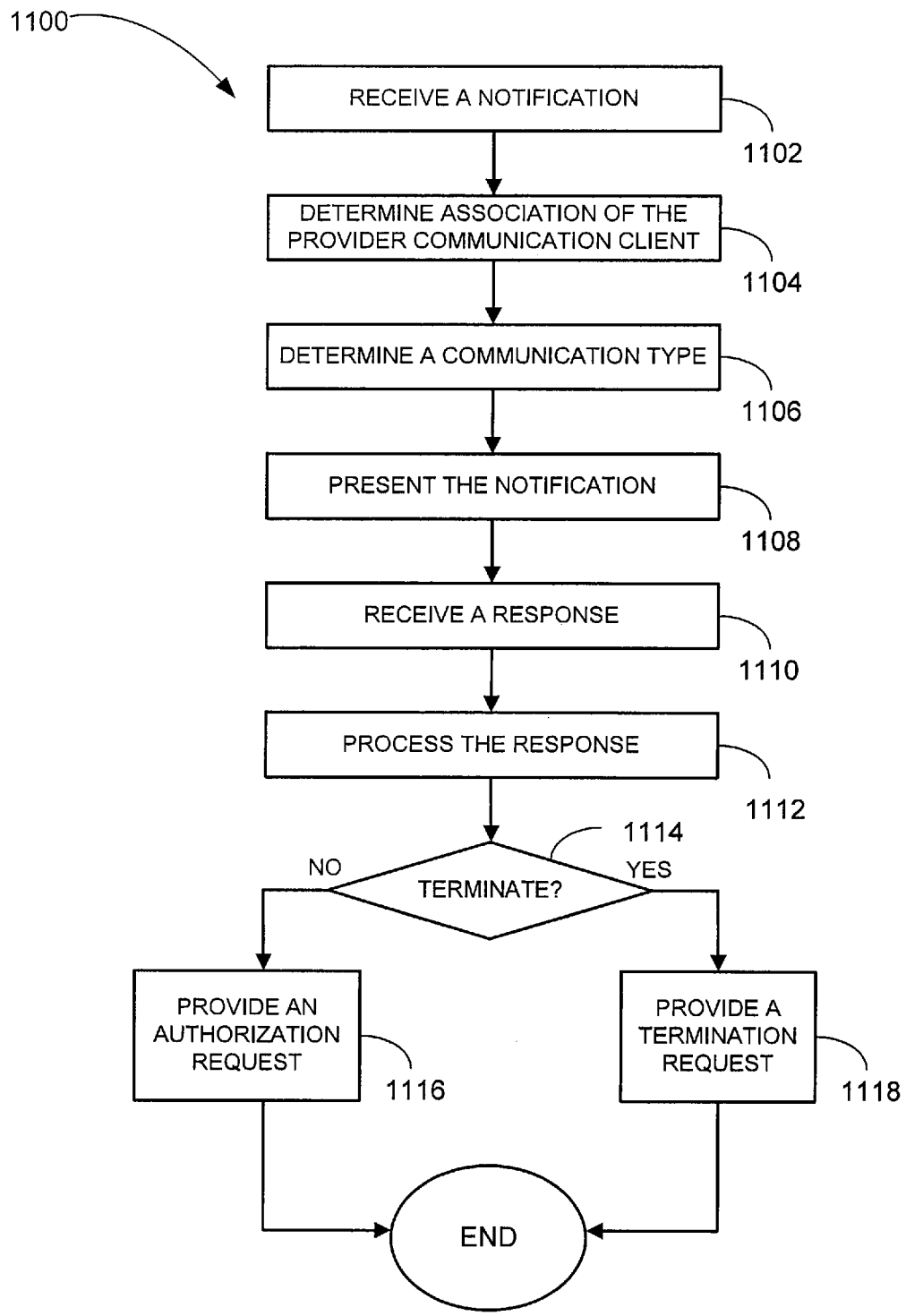
FIG. 11 is a flowchart illustrating a method for presenting a notification according to an example embodiment.

FIG. 11 illustrates a method 1100 for presenting a notification according to an example embodiment. The method 1100 may be performed by the user communication client 114 (see FIG. 1) as deployed in the system 100 or another client or application.

A communication for a user associated with a user communication identifier may be received from the provider communication client 120 at block 1102. The communication may be a notification. The notification may be an item listing notification, a login notification, a notification of a received payment, a request for a password of the user, and/or a notification of a payment being provided. Other notifications may also be used.

At block 1104, a determination may be made as to whether the provider communication client 120 is associated with an authorized provider. A communication type of the communication may be determined at block 1106.

The communication may be presented to the user in a designated area (e.g., of a user interface) of the user communication client 114 when the provider communication client 120 is associated with the authorized provider and optionally when the communication type has been authorized for presentation at block 1108.

A response from the user to the communication may be received at block 1110. The response may be a request to clear the notification, a request to provide authorization for a pending transaction, a request to terminate a pending transaction, a password of the user, or the like.

The response may be processed at block 1112. A determination may be made at decision block 1114 whether to terminate processing based on the response received. If a determination is made not to terminate processing, at block 1116 an authorization request may be provided to the provider application 118. If a determination is made at decision block 1114 to terminate processing, a termination request may be provided at block 1118 to the provider application 118.

Upon completion of the operations at block 1116 or block 1118, the method 1100 may terminate.

In an example embodiment, the method 1100 may be used to reduce spoofing attempts by providing notifications from authorized providers in the designated areas instead of in a general e-mail inbox of a user. Providing the notifications in such a manner may alert users that notifications received in their inbox are spoofed.

Figure 12:
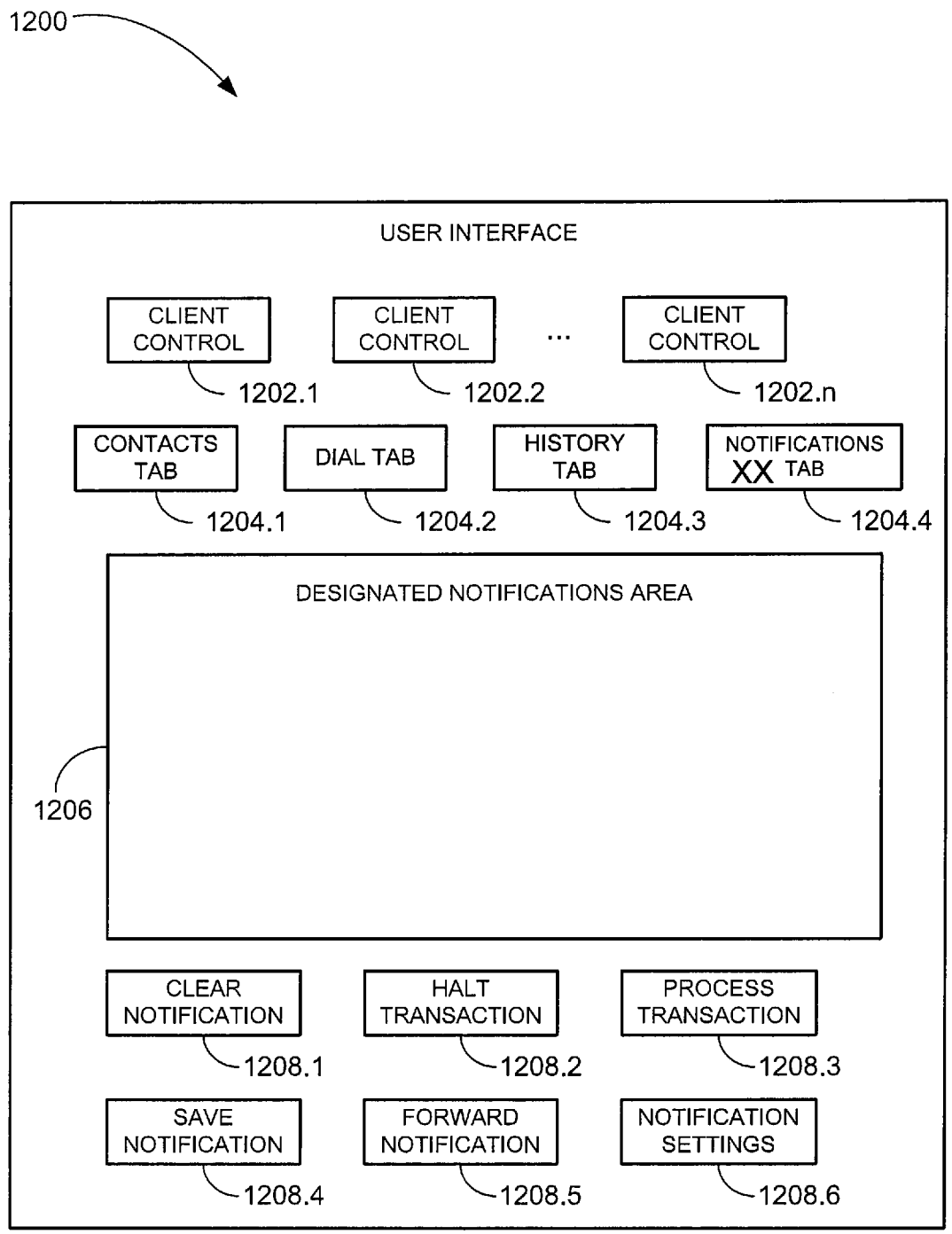
FIG. 12 is an example user interface of the user communication client of FIG. 2 according to an example embodiment.

FIG. 12 illustrates an example user interface 1200 of the user communication client 114 (see FIG. 1). The user interface 1200 may include a plurality of client controls 1202.1-120.n that may allow a user, by way of example, to add a contact to the user contacts list 116, search, call a phone, make a conference call, chat, send a short message service (SMS) message, send a file, or view a profile. Other types of client controls may also be available.

Multiple tabs 1201.1-1201.4 may also be accessible on the user interface 1200. The multiple tabs 1201.1-1201.4 may include a contacts tab 1204.1 to access the contacts (e.g., the visible contacts) on the user contacts list 116, a dial tab 1204.2 to select a contact for a VoIP teleconference, a history tab 1204.3 to request display of a log of the teleconferences and/or chats using the user communication client 114, and a notifications tab 1204.4 to view the notifications received by the user communication client 114.

The user interface 1200 is shown with the notification tab 1204.4 selected to provide a designated notifications area 1206 and a plurality of selections 1208.1-1208.8 available in the user interface 1200. The designated notifications area 1206 may present received notifications to the user. The user may clear a notification by selecting the clear notification control 1208.1, halt a transaction indicated in a notification by selecting the halt transaction control 1208.2, process a transaction indicated in a notification by selecting the process transaction control 1208.3, save a notification by selecting the save notification control 1208.4, forward a notification by selecting a forward notification control 1208.5, and/or modify notification settings by selecting the notifications settings control 1208.6. Other selections may also be available.

Figure 13:
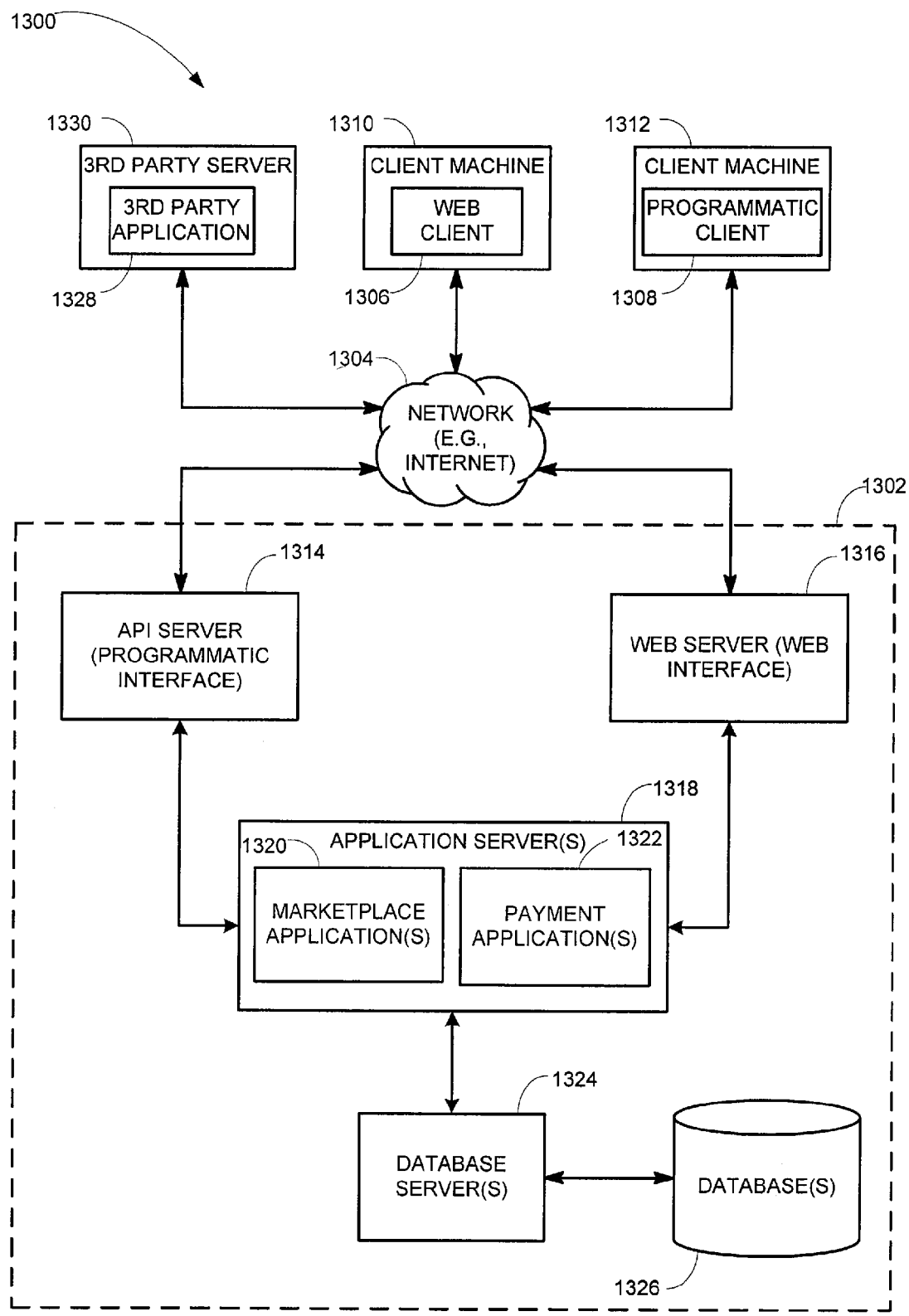
FIG. 13 is a network diagram depicting a network system, according to one embodiment, having a client server architecture configured for exchanging data over a network.

FIG. 13 is a network diagram depicting a client-server system 1300, within which one example embodiment may be deployed. For example, the system 100 (see FIG. 1) may be deployed with the client-server system 1300 (e.g., where the client machine 112 is a client machine 1310) or another system.

A networked system 1302, in the example forms of a network-based marketplace or publication system, provides server-side functionality, via a network 1304 (e.g., the Internet or Wide Area Network (WAN)) to one or more clients. FIG. 13 illustrates, for example, a web client 1306 (e.g., a browser, such as the Internet Explorer browser developed by Microsoft Corporation of Redmond, Wash. State), and a programmatic client 1308 executing on respective client machines 1310 and 1312.

An Application Program Interface (API) server 1314 and a web server 1316 are coupled to, and provide programmatic and web interfaces respectively to, one or more application servers 1318. The application servers 1318 host one or more marketplace applications 1320 and payment applications 1322. The application servers 1318 are, in turn, shown to be coupled to one or more databases servers 1324 that facilitate access to one or more databases 1326.

The marketplace applications 1320 may provide a number of marketplace functions and services to users that access the networked system 1302. The payment applications 1322 may likewise provide a number of payment services and functions to users. The payment applications 1322 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 1320. While the marketplace and payment applications 1320 and 1322 are shown in FIG. 13 to both form part of the networked system 1302, in alternative embodiments the payment applications 1322 may form part of a payment service that is separate and distinct from the networked system 1302.

Further, while the system 1300 shown in FIG. 13 employs a client-server architecture, the present invention is of course not limited to such an architecture, and could equally well find application in a distributed, or peer-to-peer, architecture system, for example. The various marketplace and payment applications 1320 and 1322 could also be implemented as standalone software programs, which need not have networking capabilities.

The web client 1306 accesses the various marketplace and payment applications 1320 and 1322 via the web interface supported by the web server 1316. Similarly, the programmatic client 1308 accesses the various services and functions provided by the marketplace and payment applications 1320 and 1322 via the programmatic interface provided by the API server 1314. The programmatic client 1308 may, for example, be a seller application (e.g., the TurboLister™ application developed by eBay Inc., of San Jose, Calif.) to enable sellers to author and manage listings on the networked system 1302 in an off-line manner, and to perform batch-mode communications between the programmatic client 1308 and the networked system 1302.

FIG. 13 also illustrates a third party application 1328, executing on a third party server machine 1330, as having programmatic access to the networked system 1302 via the programmatic interface provided by the API server 1314. For example, the third party application 1328 may, utilizing information retrieved from the networked system 1302, support one or more features or functions on a website hosted by the third party. The third party may, for example, provide one or more promotional, marketplace or payment functions that are supported by the relevant applications of the networked system 1302.

Figure 14:
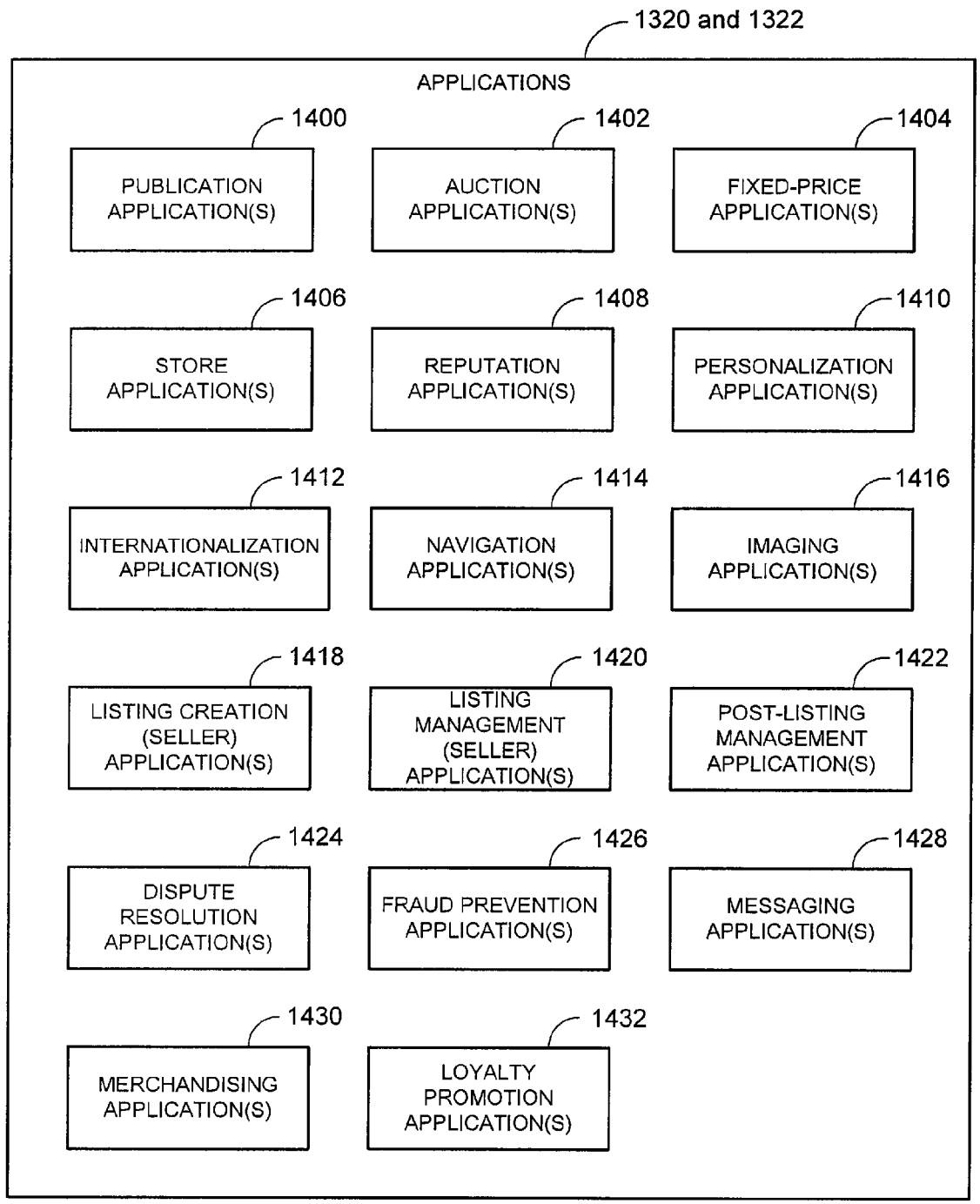
FIG. 14 is a block diagram illustrating an example embodiment of multiple network and marketplace applications, which are provided as part of the network-based marketplace.

FIG. 14 is a block diagram illustrating multiple applications 1320 and 1322 that, in one example embodiment, are provided as part of the networked system 1302 (see FIG. 1). For example, the provide application 118 may be included among the multiple applications 1320 and 1322. The applications 1320 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 1326 via the database servers 1324.

The networked system 1302 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 1320 are shown to include at least one publication application 1400 and one or more auction applications 1402 which support auction-format listing and price setting mechanisms (e.g., English, Dutch, Vickrey, Chinese, Double, Reverse auctions etc.). The various auction applications 1402 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 1404 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 1406 allow a seller to group listings within a "virtual" store, which may be branded and otherwise personalized by and for the seller. Such a virtual store may also offer promotions, incentives and features that are specific and personalized to a relevant seller.

Reputation applications 1408 allow users that transact, utilizing the networked system 1302, to establish, build and maintain reputations, which may be made available and published to potential trading partners. Consider that where, for example, the networked system 1302 supports person-to-person trading, users may otherwise have no history or other reference information whereby the trustworthiness and credibility of potential trading partners may be assessed. The reputation applications 1408 allow a user, for example through feedback provided by other transaction partners, to establish a reputation within the networked system 1302 over time. Other potential trading partners may then reference such a reputation for the purposes of assessing credibility and trustworthiness.

Personalization applications 1410 allow users of the networked system 1302 to personalize various aspects of their interactions with the networked system 1302. For example a user may, utilizing an appropriate personalization application 1410, create a personalized reference page at which information regarding transactions to which the user is (or has been) a party may be viewed. Further, a personalization application 1410 may enable a user to personalize listings and other aspects of their interactions with the networked system 1302 and other parties.

The networked system 1302 may support a number of marketplaces that are customized, for example, for specific geographic regions. A version of the networked system 1302 may be customized for the United Kingdom, whereas another version of the networked system 1302 may be customized for the United States. Each of these versions may operate as an independent marketplace, or may be customized (or internationalized and/or localized) presentations of a common underlying marketplace. The networked system 1302 may accordingly include a number of internationalization applications 1412 that customize information (and/or the presentation of information) by the networked system 1302 according to predetermined criteria (e.g., geographic, demographic or marketplace criteria). For example, the internationalization applications 1412 may be used to support the customization of information for a number of regional websites that are operated by the networked system 1302 and that are accessible via respective web servers 1316.

Navigation of the networked system 1302 may be facilitated by one or more navigation applications 1414. For example, a search application (as an example of a navigation application) may enable key word searches of listings published via the networked system 1302. A browse application may allow users to browse various category, catalogue, or system inventory structures according to which listings may be classified within the networked system 1302. Various other navigation applications may be provided to supplement the search and browsing applications.

In order to make listings available via the networked system 1302 as visually informing and attractive as possible, the marketplace applications 1320 may include one or more imaging applications 1416 utilizing which users may upload images for inclusion within listings. An imaging application 1416 also operates to incorporate images within viewed listings. The imaging applications 1416 may also support one or more promotional features, such as image galleries that are presented to potential buyers. For example, sellers may pay an additional fee to have an image included within a gallery of images for promoted items.

Listing creation applications 1418 allow sellers conveniently to author listings pertaining to goods or services that they wish to transact via the networked system 1302, and listing management applications 1420 allow sellers to manage such listings. Specifically, where a particular seller has authored and/or published a large number of listings, the management of such listings may present a challenge. The listing management applications 1420 provide a number of features (e.g., auto-relisting, inventory level monitors, etc.) to assist the seller in managing such listings. One or more post-listing management applications 1422 also assist sellers with a number of activities that typically occur post-listing. For example, upon completion of an auction facilitated by one or more auction applications 1402, a seller may wish to leave feedback regarding a particular buyer. To this end, a post-listing management application 1422 may provide an interface to one or more reputation applications 1408, so as to allow the seller conveniently to provide feedback regarding multiple buyers to the reputation applications 1408.

Dispute resolution applications 1424 provide mechanisms whereby disputes arising between transacting parties may be resolved. For example, the dispute resolution applications 1424 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 1426 implement fraud detection and prevention mechanisms to reduce the occurrence of fraud within the networked system 1302.

Messaging applications 1428 are responsible for the generation and delivery of messages to users of the networked system 1302, such messages for example advising users regarding the status of listings at the networked system 1302 (e.g., providing "outbid" notices to bidders during an auction process or to provide promotional and merchandising information to users). Respective messaging applications 1428 may utilize any one have a number of message delivery networks and platforms to deliver messages to users. For example, messaging applications 1428 may deliver electronic mail (e-mail), instant message (IM), Short Message Service (SMS), text, facsimile, or voice (e.g., Voice over IP (VoIP))

messages via the wired (e.g., the Internet), Plain Old Telephone Service (POTS), or wireless (e.g., mobile, cellular, WiFi, WiMAX) networks.

Merchandising applications 1430 support various merchandising functions that are made available to sellers to enable sellers to increase sales via the networked system 1302. The merchandising applications 1430 also operate the various merchandising features that may be invoked by sellers, and may monitor and track the success of merchandising strategies employed by sellers.

The networked system 1302 itself, or one or more parties that transact via the networked system 1302, may operate loyalty programs that are supported by one or more loyalty/promotions applications 1432. For example, a buyer may earn loyalty or promotions points for each transaction established and/or concluded with a particular seller, and be offered a reward for which accumulated loyalty points can be redeemed.

Figure 15:
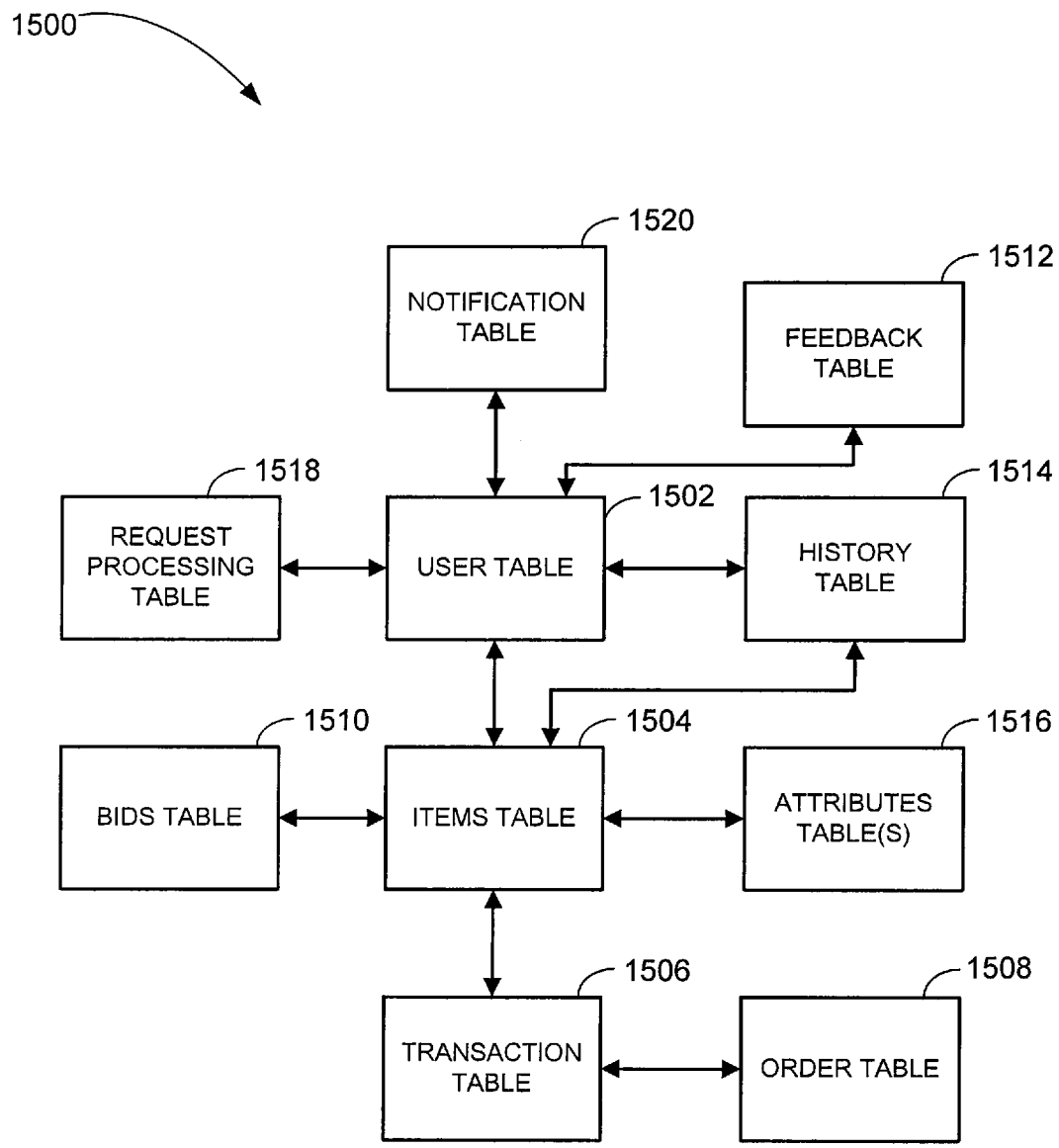
FIG. 15 is a high-level entity-relationship diagram, in accordance with one example embodiment, illustrating various tables that may be maintained within one or more databases.

FIG. 15 is a high-level entity-relationship diagram, illustrating various tables 1500 that may be maintained within the databases 1326, and that are utilized by and support the applications 1320 and 1322 (see FIG. 13). As described in greater detail below, one or more of the tables 1500 may be in the database 110 (see FIG. 1).

A user table 1502 contains a record for each registered user of the networked system 102, and may include identifier, address and financial instrument information pertaining to each such registered user. A user may operate as a seller, a buyer, or both, within the networked system 1302. In one example embodiment, a buyer may be a user that has accumulated value (e.g., commercial or proprietary currency), and is accordingly able to exchange the accumulated value for items (e.g., products and/or services) that are offered for sale by the networked system 1302.

The tables 1500 also include an items table 1504 in which are maintained item records for goods and services that are available to be, or have been, transacted via the networked system 1302. Each item record within the items table 1504 may furthermore be linked to one or more user records within the user table 1502, so as to associate a seller and one or more actual or potential buyers with each item record.

A transaction table 1506 contains a record for each transaction (e.g., a purchase or sale transaction) pertaining to items for which records exist within the items table 1504.

An order table 1508 is populated with order records, each order record being associated with an order for a good and/or service. Each order, in turn, may be with respect to one or more transactions for which records exist within the transaction table 1506.

Bid records within a bids table 1510 each relate to a bid received at the networked system 102 in connection with an auction-format listing supported by an auction application 202. A feedback table 1512 is utilized by one or more reputation applications 1408 (see FIG. 14), in one example embodiment, to construct and maintain reputation information concerning users.

A history table 1514 maintains a history of transactions to which a user has been a party. The transactions may include those pertaining to items for which records exist within the items table 1504 and for items with which no records exist within the items table 1504 (e.g., for which payment services and functions of the payment application 1322 were used without the marketplace application 1320).

One or more attribute tables 1516 record attribute information pertaining to items for which records exist within the items table 1504. Considering only a single example of such an attribute, the attribute tables 1516 may indicate a currency attribute associated with a particular item, the currency attribute identifying the currency of a price for the relevant item as specified in by a seller.

A request processing table 1518 may store association of a user identifier with a user name and/or authorization of a service request for a user associated with the user name and/or the user communication identifier.

A notification table 1520 may include a communication preference profile of the user and/or a stored verification indicating that the provider application 118 has been authorized by the communication provider server 108 for communicating through the provider communication client 120.

Figure 16:
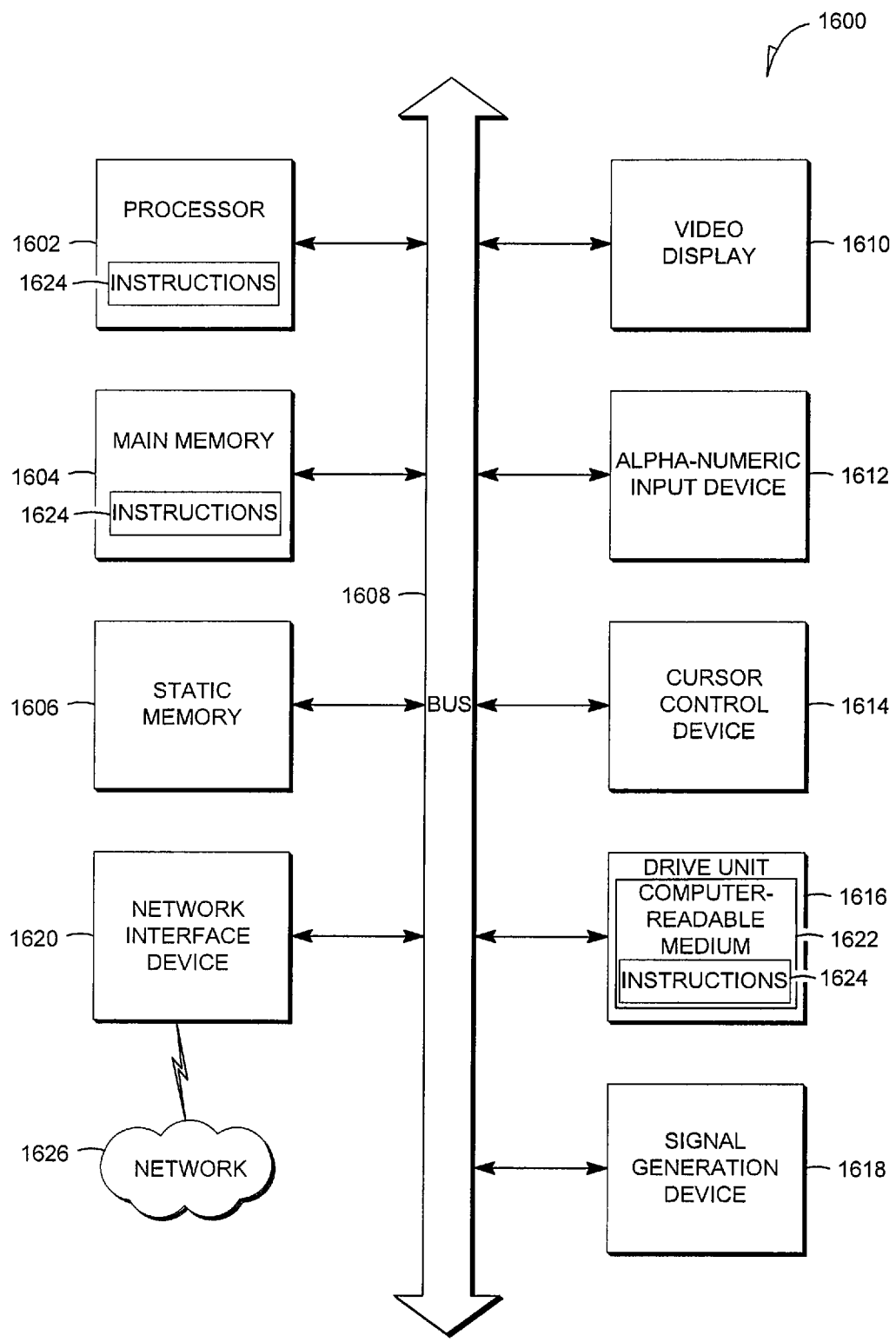
FIG. 16 is a block diagram diagrammatic representation of machine in the example form of a computer system within which a set of instructions for causing the machine to perform any one or more of the methodologies discussed herein may be executed.

FIG. 16 shows a diagrammatic representation of machine in the example form of a computer system 1600 within which a set of instructions may be executed causing the machine to perform any one or more of the methods, processes, operations, or methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU) a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a drive unit 1616, a signal generation device 1618 (e.g., a speaker) and a network interface device 1620.

The drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media.

The software 1624 may further be transmitted or received over a network 1626 via the network interface device 1620.

While the machine-readable medium 1622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium"

shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for notification and request processing have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   at a client application residing on a client machine, receiving, from a client, a service request to send to a provider application residing on a provider server;
   verifying the client is authorized to access a user instant messaging client, the user instant messaging client residing on the client machine and configured to provide a secure communication channel between the user instant messaging client and a provider instant messaging client;
   verifying the client is authorized to use a service designated by the service request;
   verifying the client is authorized to send the service request to the provider application via the user instant messaging client;
   selecting a provider communication identifier of the provider application from a user contacts list accessed by the user instant messaging client; and
   sending the service request from the user instant messaging client via the secure communication channel to the provider instant messaging client associated with the provider communication identifier.

2. The method of claim 1, wherein the receiving of the service request includes:
   configuring the user instant messaging client to communicate with the provider instant messaging client.

3. The method of claim 2, wherein the configuring the user instant messaging client comprises:
   authorizing the user instant messaging client to communicate with the provider instant messaging client for the client, the provider instant messaging client being associated with the second application.

4. The method of claim 2, wherein the configuring the user instant messaging client comprises:
   adding the provider communication identifier associated with the provider instant messaging client to the user contacts list.

5. The method of claim 4, wherein the selecting comprises:
   identifying the provider communication identifier of the provider instant messaging client from the user contacts list.

6. The method of claim 1, wherein the service request is at least one of a login request, a transaction request, or combinations thereof.

7. A method comprising:
   at a provider application residing on a provider server, receiving a service request and a user communication identifier from a provider instant messaging client, the provider instant messaging client residing on the provider server and configured to provide a secure communication channel between a user instant messaging client and the provider instant messaging client;
   identifying a user associated with the user communication identifier;
   verifying that the user has authorized the provider application to process the service request through a user instant messaging client;
   verifying that the service request is among the service requests authorized for the user; and
   processing the service request.

8. The method of claim 7, wherein the receiving the service request and the user communication identifier includes:
   configuring the provider application.

9. The method of claim 8, wherein the configuring the provider application comprises:
   associating the user communication identifier to a user name of the user at the provider application, the provider application identifying the user based on the user name.

10. The method of claim 9, further comprising:
    storing an authorization for service request processing from the user associated with the user name and the user communication identifier, the authorization authorizing the provider application to receive the service request from a provider instant messaging client.

11. The method of claim 7, further comprising:
    providing a response to the service request through the provider instant messaging client.

12. The method of claim 7, further comprising:
    providing a response to the service request to a client.

13. A method comprising:
    at a provider application residing on a provider server, generating a notification directed to a user of a provider application, the user being at a client residing on a client machine;
    determining a user communication identifier associated with the user;
    verifying that the user communication identifier is on a list of provider contacts of the provider instant messaging client;
    verifying that the user has authorized the provider application to provide the notification through a user instant messaging client; and providing the notification to a provider instant messaging client having access to the user communication identifier stored on a provider contacts list, the provider instant messaging client residing on the provider server and configured to provide a secure communication channel between a user instant messaging client and the provider instant messaging client.

14. The method of claim 13, wherein the determining of the user communication identifier comprises:
determining a notification preference of the user, the notification preference being that the notification is provided using the provider instant messaging client; and
based on the determination, selectively identifying the user communication identifier associated with the user.

15. The method of claim 13, wherein the determining of the user communication identifier comprises:
receiving a communication preference modification request;
modifying a communication preference of the user based on the communication preference modification request; and
generating a notification for the user of the provider application.

16. The method of claim 13, wherein the determining of the user communication identifier comprises:
initiating processing of a transaction; and
generating a notification regarding the transaction for a user of a provider application.

17. The method of claim 16, further comprising:
receiving a response to the notification from the user; and
halting processing of the transaction based on the received response.

18. The method of claim 16, further comprising:
receiving a response to the notification from the user; and
completing processing of the transaction based on the received response.

19. The method of claim 13, wherein the determining of the user communication identifier comprises:
halting processing of a transaction; and
generating a notification regarding the transaction for the user of the provider application.

20. The method of claim 19, further comprising:
receiving a password and a response from the user;
verifying the password of the user; and
processing the transaction in accordance with the response.

21. A method comprising:
at a client application residing on a client machine, receiving, from a provider application, a notification and a selection of a user communication identifier, the user communication identifier being included in a provider contacts list;
verifying that the provider application has been authorized by a communication provider server to communicate through a provider instant messaging client and that the provider instant messaging client is associated with the provider application, the provider instant messaging client residing on the provider server and configured to provide a secure communication channel between a user instant messaging client and the provider instant messaging client; and
providing the notification to the user instant messaging client associated with the user communication identifier through the provider instant messaging client.

22. The method of claim 21, wherein receiving the notification and the selection of the user communication identifier on a provider contacts list comprises validating the provider application based on a verification criterion.

23. The method of claim 22, wherein the verification criterion includes an IP address.

24. The method of claim 21, wherein verifying comprises:
sending a verification request it to verify the provider instant messaging client to the communication provider server; and
receiving a verification response from the provider communication provider server, the response indicating that the provider application is authorized by the communication provider server for communicating through the provider instant messaging client.

25. The method of claim 21, wherein verifying comprises:
accessing a stored verification of the provider application, the stored verification indicating the provider application is authorized by the communication provider server for communicating through the provider instant messaging client.

26. The method of claim 21, wherein providing the communication to the user instant messaging client comprises:
accessing a notification preference profile of the user;
accessing a notification type of the notification;
determining whether the notification preference profile of the user includes the notification type; and
based on the determination, selectively providing the notification to the user instant messaging client associated with the user communication identifier through the provider instant messaging client.

27. The method of claim 26, wherein the notification type includes at least one of a warning message, an advertisement, or combinations thereof.

28. A method comprising:
at a client application residing on a client machine, receiving a notification from a provider instant messaging client directed to a user identified by a user communication identifier;
making a first determination that the provider instant messaging client is associated with an authorized provider based on a user contacts list and that the provider instant messaging client has been authorized to communicate through the provider instant messaging client; and
based on the determination, presenting the notification to the user in a designated area of an interface generated by a user instant messaging client, the user instant messaging client residing on a client machine and configured to provide a secure communication channel between the user instant messaging client and the provider instant messaging client.

29. The method of claim 28, wherein presenting the notification to the user further comprises:
making a second determination that a notification type of the notification is authorized for presentation.

30. The method of claim 28, further comprising:
receiving a response to the notification from the user; and
processing the response.

31. The method of claim 30, wherein the response includes a request to clear the notification.

32. The method of claim 30, wherein the response includes a request to provide authorization for a pending transaction.

33. The method of claim 32, further comprising:
providing the authorization request to the provider application, the provider application to authorize the pending transaction.

34. The method of claim 30, wherein the response includes a request to terminate a pending transaction.

35. The method of claim 34, further comprising:
providing the termination request to the provider application, the provider application to terminate the pending transaction.

36. The method of claim 28, wherein the notification includes at least one of an item listing notification, a login notification, a received payment notification, a payment being provided notification, a request for a password of the user, or combinations thereof.

37. The method of claim 28, wherein the designated area is an exclusive area of the interface generated by the user instant messaging client for presenting the notification to the user.

38. A system on a client machine comprising:
a request receiving module configured to receive a service request from a client to send to a provider application;
a verifying module configured to:
verify the client is authorized to access a user instant messaging client, the user instant messaging client residing on the client machine and configured to provide a secure communication channel between the user instant messaging client and a provider instant messaging client;
verity the client is authorized to use a service designated by the service request; and
verify the client is authorized to send the service request to the provider application via the user instant messaging client;
an identification module configured to identify a provider communication identifier of the provider application from a user contacts list accessed by the user instant messaging client; and
a request provider module configured to send the service request from the user instant messaging client via the secure communication channel to a provider instant messaging client associated with the provider communication identifier.

39. The system of claim 38, further comprising:
a configuration module to configure the user instant messaging client to communicate with the provider instant messaging client for the client, the provider instant messaging client being associated with the provider application.

40. A system on a provider server comprising:
a service request receiver module configured to receive a service request and a user communication identifier from a provider instant messaging client, the provider instant messaging client residing on a provider server and configured to provide a secure communication channel between a user instant messaging client and the provider instant messaging client;
a user name identification module configured to identify a user name associated with the user communication identifier;
a verification module configured to verify that a user associated with the user name and the user communication identifier has authorized the provider application to process the service request through a user instant messaging client and to verify that the service request is among the service requests authorized for the user; and
a processing module configured to process the service request when the authorized service request processing is verified.

41. The system of claim 40, further comprising:
a response providing module configured to provide a response to the service request through the provider instant messaging client.

42. A system on a client machine comprising:
a notification generation module configured to generate a notification directed to a user of a provider application, the user being a client residing on the client machine;
an identifier identification module configured to identify a user communication identifier associated with the user;
a verification module configured to verify that the user communication identifier has authorized processing of a service request through a user instant messaging client and that the client is authorized to use a service designated by the service request; and
a notification providing module configured to provide the notification to a provider instant messaging client having access to the user communication identifier stored on a provider contacts list, the provider instant messaging client residing on the provider server and configured to provide a secure communication channel between the user instant messaging client and the provider instant messaging client.

43. The system of claim 42, further comprising:
a communication preference module configured to receive a communication preference modification request and modify a communication preference of the user based on the communication preference modification request.

44. The system of claim 42, further comprising:
a response receiver module configured to receive a response to the notification from the user.

45. The system of claim 44, further comprising:
a processing operations module configured to perform at least one of halting processing of the transaction and completing processing of the transaction based on the received response.

46. A non-transitory machine-readable medium comprising instructions, which when implemented by one or more processors perform a method comprising:
receiving a notification from a provider instant messaging client directed to a user identified by a user communication identifier;
determining that the provider instant messaging client is associated with an authorized provider based on a user contacts list and that the user has authorized the provider application to provide the notification through a user instant messaging client; and
presenting the notification to the user in a designated area of an interface generated by a user instant messaging client, the user instant messaging client residing on a client machine and configured to provide a secure communication channel between the user instant messaging client and the provider instant messaging client.

47. The non-transitory machine-readable medium of claim 46 wherein the method further comprises:
receiving a response from the user to the notification; and
processing the response.

* * * * *

UNITED STATES PATENT AND TRADEMARK OFFICE
CERTIFICATE OF CORRECTION

PATENT NO.         : 8,844,002 B2                              Page 1 of 1
APPLICATION NO.    : 11/771180
DATED              : September 23, 2014
INVENTOR(S)        : Monahan et al.

It is certified that error appears in the above-identified patent and that said Letters Patent is hereby corrected as shown below:

In the Claims

In column 20, line 4, in Claim 24, after "request", delete "it", therefor

In column 21, line 24, in Claim 38, delete "verity" and insert --verify--, therefor Signed and Sealed this
Thirtieth Day of December, 2014

Michelle K. Lee
*Deputy Director of the United States Patent and Trademark Office*